United States Patent [19]

Forsgren

[11] 3,934,944
[45] Jan. 27, 1976

[54] GROUND ENGAGING DRIVE TRACK APPARATUS FOR SNOWMOBILES AND THE LIKE

[75] Inventor: Lyle M. Forsgren, Fond Du Lac, Wis.

[73] Assignee: Brunswick Corporation, Skokie, Ill.

[22] Filed: Sept. 27, 1974

[21] Appl. No.: 510,062

[52] U.S. Cl. .............................. 305/38; 180/9.2 R
[51] Int. Cl.² ........................................ B62D 55/08
[58] Field of Search .......... 305/35 R, 35 EB, 36, 37, 305/38; 180/9.2; 74/231 C, 237

[56] References Cited
UNITED STATES PATENTS

| | | | |
|---|---|---|---|
| 3,704,918 | 12/1972 | Perreault | 305/38 |
| 3,721,477 | 3/1973 | Cooper | 305/38 |
| 3,781,067 | 12/1973 | Dodson | 305/35 EB |
| 3,799,627 | 3/1974 | Zwieg | 305/38 |
| 3,830,551 | 8/1974 | Masaoka | 305/35 EB |

*Primary Examiner*—Philip Goodman
*Assistant Examiner*—John A. Carroll
*Attorney, Agent, or Firm*—Andrus, Sceales, Starke & Sawall

[57] ABSTRACT

A snowmobile drive track assembly includes an endless belt unit having a central drive belt section and laterally spaced belt sections interconnected by flat, spring-steel track bars. The several sections include longitudinally aligned ground-engaging drive ribs holding the bars in spaced relation to the ground. The bars are molded into the outer surface of the ground engaging side of the belt immediately adjacent the wall of the depending snow engaging ribs. The bar extends essentially completely throughout the width of the three sections with the undersurface completely exposed and drive lugs provided on the backside of the central section. The exposure of the bars on the outer side of the track unit essentially throughout the complete width of the track unit significantly increases the heat dissipating characteristics of the belt unit. The belt is suitably reinforced by embedding of nylon fabric and longitudinal cords. The track bars are suitably treated, prior to molding, to provide adherence to the interconnecting rubber which may, however, be readily loosened for removal of a bar by use of a suitable solvent such as methol-ethyl ketone.

15 Claims, 4 Drawing Figures

U.S. Patent    Jan. 27, 1976    3,934,944
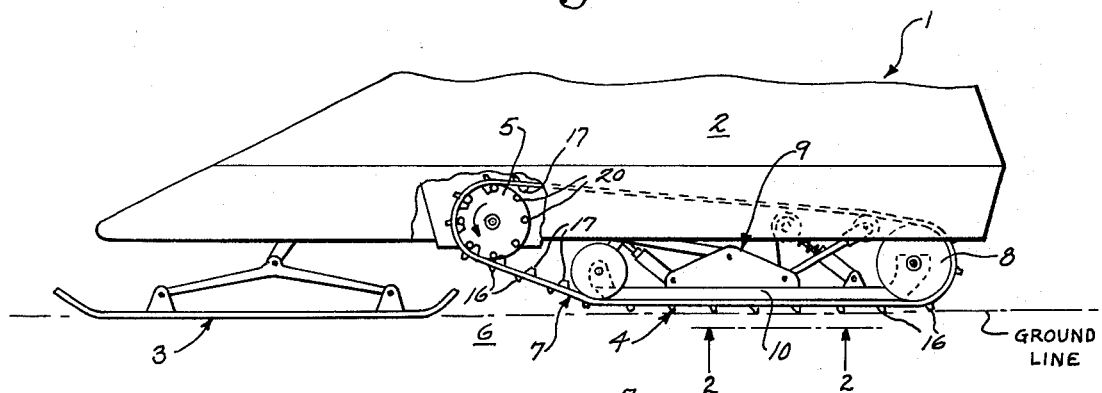
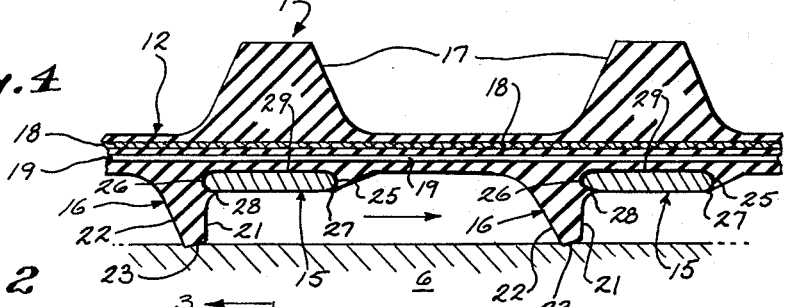
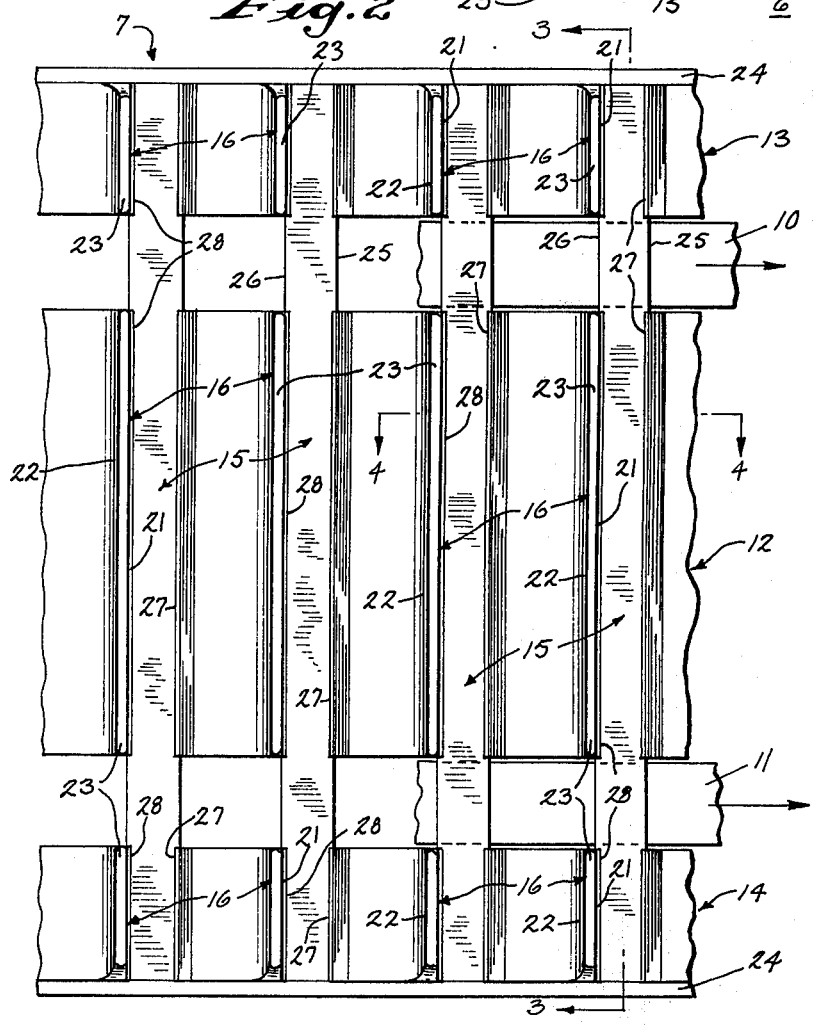
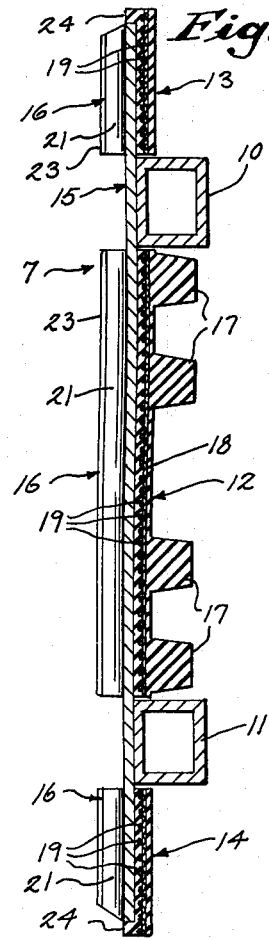

GROUND ENGAGING DRIVE TRACK APPARATUS FOR SNOWMOBILES AND THE LIKE

BACKGROUND OF THE INVENTION

The present invention is directed to a ground engaging drive track apparatus for a snowmobile vehicle or the like.

Snowmobiles and other all-terrain vehicles may advantageously employ a drive means in the form of an endless track assembly or unit mounted within a tunnel in a supporting chassis. The track unit includes an endless rubber-like belt having outer ground engaging ribs or cleats to propel the vehicle. An internal suspension system is provided to maintain proper ground engagement of the cleats of the lower run of the endless belt. The suspension systems are generally of a bogey-wheel or a slide rail construction. Slide rail suspension systems are particularly advantageously employed in high speed drive systems for such vehicles such as racing vehicles and the like, in order to establish and maintain maximum lineal support and minimum undulation in the flexible endless drive track unit. An extremely satisfactory slide rail suspension system is particularly and fully disclosed in Applicant's copending application entitled "SUSPENSION APPARATUS FOR GROUND ENGAGING DRIVE TRACKS" filed Apr. 1, 1974 and bearing Ser. No. 456,478, wherein a pair of slide rails slidably engaging the upper surface of a belt track member along the length of the lower run. In order to maximize the effective ground track engagement, various belt systems have been developed which incorporate generally U-shaped "grouser" bars formed as a part of the belt. The bars extend laterally across the track with the lower depending edges located so as to form ground engaging cleat and drive elements. Generally the grouser bars are either molded or otherwise attached to the bottom portion of the snowmobile track with the edges projecting downwardly into the ground engagement. In at least one embodiment of prior art construction such bars are fully embedded into the rubber track base belt with the lower or outer portion or run exposed to engage the ground and the lower portion or run exposed only in the areas of the slide rail.

Although such systems provide improved drive, Applicant has found that the exposed edges of the metal bars are not as effective on ice and the like as a more conventional molded rubber cleat. Further, when running on a hard surface, the temperature of the metal bars increase significantly as a result of frictional contact with the slide rail. This reduces the efficiency of the drive means, as well as presenting a source of possible severe damage to the track assembly. Although special lubrication can be provided, the system would be more complicated and rely on the satisfactory and continued functioning of the system.

In summary, although the grouser bar type of snowmobile track has been satisfactorily employed, Applicant has noted the distinct disadvantages associated with the unit from a practical standpoint and particularly an optimum construction in operation of high speed snowmobile units and other all-terrain vehicles.

SUMMARY OF THE INVENTION

The present invention is particularly directed to a ground engaging drive track assembly having rubber-like cleats in combination with special supporting track bars. Generally in accordance with the present invention, a ground engaging belt unit includes a plurality of laterally extended and longitudinally spaced exposed "track" bars interconnected to the undersurface of a supporting flexible central belt in combination with depending rubber-like ribs extending laterally across the belt into ground engagement. The rubber-like material of the belt is removed in the area of the slide rails or other guide means and the track bars provide the desired supporting surfaces for the slide rails. In operation, all traction is through the depending rubber ribs as the metal bar is maintained in significant spaced relation to the lowermost surface of the track as defined by the depending rubber ribs. Applicant has found that the combination of the exposed, upwardly-spaced track bars and the depending rubber-like ribs significantly increases the effectiveness on ice while maintaining the desired effectiveness on other surfaces. The exposure of the bars on the outer side of the track unit essentially throughout the complete width of the track unit further significantly increases the heat dissipating characteristics and thereby significantly minimizes the generation of heat as a result of frictional contact with the slide rails, particularly when running on a hard surface.

Further, in accordance with a further aspect of the invention, the exposed track bars are initially molded as an integrated part of the rubber belt. The bar is suitably treated, however, prior to molding to provide adherence to the interconnecting rubber which may, however, be readily loosened for removal of a bar by use of a suitable solvent such as metholethyl ketone.

In a particularly practical application of the present invention, the belt unit is constructed with a central drive belt section and laterally spaced belt sections interconnected by flat, spring-steel track bars. The flat track bars are molded into the conventional rubber track mold with the track bars molded into the outer surface of the ground engaging side of the belt immediately adjacent the leading or front wall of the depending snow engaging ribs. The bar extends essentially completely throughout the width of the three rubber belt sections with the undersurface completely exposed and drive lugs provided on the backside of the central section. The belt is suitably reinforced by embedding of nylon fabric and longitudinal cords. In a practical construction, the ground engaging ribs project downwardly approximately one-half inch from the undersurface of the track bars and are formed with a generally vertical leading or front wall and a trailing inclined wall of approximately thirty degrees. The face of the depending rubber ribs are essentially normal to a center line through the rib and thus in a practical construction at approximately fifteen degrees to the horizontal.

The present invention with the relatively flat track bars are readily constructed in accordance with conventional molding practice to provide a highly improved high speed track unit for snowmobiles and the like, particularly where they are required to operate over hard surfaces such as ice.

BRIEF DESCRIPTION OF THE DRAWING

The drawing furnished herewith illustrates the best mode presently contemplated by the inventor for carrying out the subject invention in which the above advantages and features are clearly disclosed as well as others which will be readily understood from the following description of the illustrated embodiment.

In the drawing:

FIG. 1 is a side view of a diagrammatically illustrated snowmobile unit with parts broken away to show a track assembly constructed in accordance with the teaching of the present invention;

FIG. 2 is an enlarged fragmentary bottom view of the drive track assembly unit taken generally on line 2—2 of FIG. 1;

FIG. 3 is a sectional view taken generally on line 3—3 of FIG. 2; and

FIG. 4 is a sectional view taken generally on line 4—4 of FIG. 2.

DESCRIPTION OF THE ILLUSTRATED EMBODIMENT

Referring to the drawing and particularly to FIG. 1, a snowmobile vehicle 1 is partially illustrated with a chassis 2 supported at the front on a suitable ski assembly 3 and at the rear by an endless track assembly 4. In accordance with the usual practice, the forward portion of the housing or chassis contains an engine, not shown, coupled to a drive sprocket unit 5 for driving of the track assembly 4 and propelling of the vehicle over the snow or other similar ground structure 6.

The track assembly 4 in particular includes an endless belt unit 7 coupled at the forwardmost end to the aligned sprocket unit 5 and at the aft end to guide wheels 8 with an intermediate slide rail suspension assembly 9 as more fully disclosed in Applicant's previously referred to copending application. The slide rail suspension assembly 9, in particular, includes a pair of laterally spaced lower rails 10 and 11 resiliently urged downwardly into sliding engagement with the backside of the lower run of the endless belt unit 7 to establish a highly effective linear support of the ground engaging lower run.

The present invention is particulary directed to the construction of the belt unit 7 which is therefore more fully illustrated in FIGS. 2-4 and subsequently described. No further description of the syspension system or of the other portions of the snowmobile is set forth other than in relation to the illustrated embodiment of the invention as they may be of any suitable construction.

Referring to FIGS. 2-4, the belt unit 7 is generally a rubber molded member having a central drive section 12 interconnected to outer lateral end sections 13 and 14 by a plurality of longitudinally spaced track bars 15 which are especially constructed and secured to the outer face of the sections 12-14 in accordance with the teaching of the present invention. The central section 12 and end sections 13 and 14 are spaced to locate the exposed track bars 15 in accordance with the spacing of the slide rails 10 and 11. Each of the sections 12-14 is similarly molded or otherwise constructed with aligned and laterally extending depending ground-engaging ribs 16 which extend laterally across the corresponding belt portion and define the ground-engaging members spacing the intermediate belt portion of the belt unit 7 and particularly the interconnecting track bars 15 from the ground 6. Drive lugs 17 are formed on the backside of the central section 12 of the belt unit 7 and suitably spaced to mesh with the drive sprockets 5 at the forward end of the track unit 7. The central section 12 is thereby positively driven with the total assembly 7 rotating as an endless member and with the slide bars 10 and 11 engaging the inner or top side of the track bars 15 between the central section 12 and the end sections 13 and 14 as the lower run moves beneath the slide rail unit 9. This establishes a resilient, forced ground engagement of the depending ribs 16 upon the supporting ground 6, for example, as most clearly shown in FIG. 4.

More particularly, in the illustrated embodiment of the invention, the belt sections 12-14 each includes a molded rubber central base in the form of an endless strip having embedded therein a nylon fabric 18 along the backside thereof and a plurality of laterally spaced cable cords 19 of fiberglass or the like in outwardly spaced relation to the nylon fabric to create a high strength belt structure. The drive lugs 17 are integrally molded to the inner side of the belt base with appropriate inclined leading and trailing walls to provide meshing with the sprocket pins 20 in accordance with well-known constructions. In the illustrated embodiment, a pair of sprockets 5 are provided with corresonding lug pairs 17 molded into the belt unit 7.

As most clearly shown in FIG. 4 each of the ground engaging ribs 16 is formed with a generally vertical leading wall 21 and an inclined trailing wall 22 which is preferably formed with an angle of approximately 30° to the vertical. The lowermost face 23 of the ribs 16 are formed with an inclined face preferably including an angle of approximately 15° extending downwardly from the leading wall 21. Thus, the ribs 16 rest on the ground with the trailing edge engaging the ground and with the rib rotating into the ground as the track assembly is driven over the ground.

The end sections 13 and 14 are essentially molded and formed of a rubber-like material similar to the intermediate portion but without the back drive lugs. Further, the end sections 13 and 15 also preferably include end lips 24 projecting downwardly over the ends of the track bars 15, as most clearly shown in FIG. 3.

The opposite end sections 13 and 14 are spaced from the central section 12 to completely expose the track bars 15 therebetween. The molded belt portion of the sections 12-14 create channels within which the slide bars or rails 10 and 11 are guided in sliding engagement with the inner or back surfaces of the track bars 15 to provide effective ground engagement of the laterally extending ribs.

The special track bars 15 are essentially flat straps formed of a suitable metal or other material having high strength and good heat dissipating properties. Generally, a suitable spring steel such as a 1074 spring steel has been satisfactorily employed. Each of the illustrated track bars 15 may be formed with leading and trailing circular or curved edges 25 and 26 as most clearly shown in FIG. 4. The bars 15 are integrally molded within the outer or ground exposed surface of the belt base immediately adjacent to the leading wall 21 of an adjacent rib 16. The trailing edge 26 of the track bar 15 is generally aligned with the forward wall 21 of the ground engaging rib 16 and the width of the track bar 15 is equal to about one-third of the spacing between the ribs. The belt bars is molded downwardly about the opposite end edges 25 and 26 of the track bar 15 to the outer face or to project only slightly onto the lower surface as at 27 and 28 in FIGS. 2 and 4, thereby maintaining essentially continuous complete exposure of the undersurface of the bar 15 to the adjacent atmosphere and ground.

The complete traction of the assembly is maintained through the rubber-like tread formed by the several aligned depending ribs 16. This significantly increases the effectiveness on ice while maintaining the desired effectiveness on other ground surfaces. Further, although the frictional engagement with the slide bars 10 and 11, particularly when traversing a hard surface, will tend to generate heat in a manner similar to that previously encountered with the conventional grouser bar construction, the spacing and exposure of the unique track bars across essentially their entire length to the adjacent snow and/or to the surrounding atmosphere significantly increases the heat dissipation characteristic. As a result the running temperature of the track unit is significantly reduced.

As most clearly illustrated and shown in FIG. 4 by a heavy dividing line 29, track bar 15 is preferably surface treated prior to molding to effect adherence between the metal surface and the rubber belt. Any well-known method can be employed such as that previously employed in the molding of grouser bars to a rubber belt support. The exposed track bars 15 with the overlapping edges 26 and 27 of this invention permits convenient application of a suitable solvent along the edges which may work between the bar 15 and the belt portion for convenient removal. If a bar is damaged for any reason, it can be readily replaced even though it is initially molded within the unit.

The present invention thus provides a ground engaging track unit for snowmobiles and the like with optimum traction as a result of depending rubber ribs as well as highly improved heat dissipation characteristics as a result of the exposure of the metal track bars. Applicant has found the highly improved snowmobile track unit of this invention is particularly adapted for high speed snowmobiles such as racing machines.

Various modes of carrying out the invention are contemplated as being within the scope of the following claims, particularly pointing out and distinctly claiming the subject matter which is regarded as the invention.

I claim:

1. A drive track assembly for driving a vehicle over a support surface comprising an endless drive track means including a drive run and a return run with an internal suspension system urging the drive run into drive engagment with the support surface, said track means comprising a plurality of laterally spaced belt sections, a plurality of longitudinally spaced and laterally extending track members secured to the outer surface of said spaced sections and defining exposed heat transfer members within said belt sections, said track members being formed of a good heat dissipating material, and a plurality of depending drive engaging members on said sections supporting said track members in spaced relation to the drive surface.

2. The drive track assembly of claim 1 wherein said sections are formed of an integral base portion and drive engaging members, said track members being releasably bonded to the base portion between said drive engaging members.

3. The track assembly of claim 1 wherein an adhesive releasably secures each track member to the belt section.

4. The drive track assembly of claim 1 wherein said track members are secured to said belt sections one each adjacent to one of the drive engaging members.

5. The track assembly of claim 1 wherein the backside of said belt sections project outwardly from said track members to define longitudinal guide channels, said suspension system having slide rails located within said guide channels.

6. The drive track assembly of claim 1 wherein said track means includes three laterally spaced sections including a central drive section and oppositely located end sections, said sections being formed of a rubber base having integral drive ribs, said track members being flat metal bars releasably bonded to the base intermediate said ribs, the rubber base extending outwardly of said metal members to define a pair of slide rails receiving longitudinal channels.

7. The drive track assembly of claim 1 wherein said endless drive track means is secured to a snowmobile and said endless drive track means includes a lower ground engaging run and an upper return run, said sections including three laterally spaced endless flexible belt sections formed or a rubber-like material, said central section including drive lug means located on the inner surface thereof, said three sections having a base portion with integral depending aligned ribs forming said ground engaging members, said track members including a plurality of parallel, flat track bars releasably secured to the outer wall of the belt adjacent a rib each of said track bars extending laterally throughout the width of the spaced sections.

8. The track assembly of claim 7 wherein each of said ribs includes a generally normal front wall and an inclined outermost wall extending rearwardly and outwardly from said front wall and a rear wall extending angularly from said rear lower edge rearwardly and inwardly to the central belt portions.

9. The track assembly of claim 1 wherein each of said track bars includes curved leading and trailing edges with the belt portions molded about the curved edges and terminating immediately adjacent to the curved edges to essentially completely expose the metal bars across the entire length of the belt unit to the adjacent snow and atmosphere, said belt being welded in place and being releasable from said belt unit by a suitable solvent.

10. An endless drive track apparatus including a lower ground engaging run and an upper return run, said track comprising three laterally spaced flexible endless rubber-like belt sections including integral depending ground engaging ribs, a plurality of parallel track bars secured to the outer wall of the belt sections and defining exposed track bars being flat straps and formed of an essentially flexible metal, each track bar extending laterally throughout the width of the spaced sections and being spaced upwardly from the ground engaging ends of the ribs to essentially prevent terrain engagement.

11. The track apparatus of claim 10 wherein said central section including drive lug means located on the inner surface thereof.

12. The track apparatus of claim 10 wherein each of said ribs including a generally normal front wall and an inclined outermost wall extending rearwardly and outwardly from said front wall and a rear wall angularly extending from said rear lower edge rearwardly and inwardly to the belt section.

13. The track apparatus of claim 11 wherein each bar is located adjacent to the outer wall of the innermost edge of the front wall of the ribs.

14. The track apparatus of claim 10 wherein each of said track bars having curved leading and trailing edges with the belt portions molded about the curved edges and terminating immediately adjacent to the lower ends of the curved edges to completely expose the outer surface of the metal bars across the entire length of the belt unit to the adjacent snow terrain and atmosphere, said bar being molded in place and being releasable from said belt unit by a suitable solvent.

15. In a snowmobile having a body and an endless drive track including a lower ground engaging run and an upper return run, a drive sprocket means on said body engaging said drive track to propel the snowmobile, a yieldable slide rail suspension system interconnected to said body and positioned within the endless drive track between said upper and lower lines and including a pair of resiliently slide rails urged downwardly into resilient engagement with said lower ground engaging run to provide linear support of the lower run upon the terrain, said track including three endless laterally spaced rubber belt sections having integral depending ground engaging ribs with the belt sections spaced in accordance with the spacing of the slide bars, track bars releasably secured to the outer wall surfaces of the belts adjacent the ground engaging ribs, said track bars being flat metal bars of a thickness significantly less than the depth of said ribs to thereby maintain the bars in significant spaced relation to the terrain, said track bars being releasably, firmly affixed to the belt sections, said slide rails engaging the track bars between said sections and forming the force transmitting members from the slide rails to the tracks whereby said track maintains rubber ribs in driving engagement with the terrain and exposure of each of the track bars to dissipate heat.

* * * * *

UNITED STATES PATENT AND TRADEMARK OFFICE
CERTIFICATE OF CORRECTION

PATENT NO. : 3,934,944
DATED : January 27, 1976
INVENTOR(S) : LYLE M. FORSGREN

It is certified that error appears in the above-identified patent and that said Letters Patent are hereby corrected as shown below:

| | | | |
|---|---|---|---|
| Column 1, | Line 43, | at the end of the line cancel "lower" and insert --- inner ---; |
| Column 1, | Line 52, | after "slide" cancel "rail" and insert --- rails ---; |
| Column 1, | Line 58, | insert quotation marks around the word grouser --- "grouser" ---; |
| Column 2, | Line 10, | cancel "surfaces" and insert --- surface --- after "supporting"; |
| Column 3, | Line 39, | cancel "sypension" and insert --- suspension ---; |
| Column 4, | Line 33, | cancel "15" and insert --- 14 ---; |
| Column 4, | Line 59, | after "belt" cancel "bars" and insert --- base ---; |
| Column 5, | Line 6, | insert quotation marks around the word grouser --- "grouser" ---; |
| Column 6, CLAIM 7 | Line 15, | after "formed" cancel "or" and insert --- of ---; |
| Column 6, CLAIM 7 | Line 21, | after "ribs" insert --- a comma (,) ---; |
| Column 6, CLAIM 9 | Line 36, | cancel "belt" and insert --- bar --- and cancel "welded" and insert --- molded ---; |

UNITED STATES PATENT AND TRADEMARK OFFICE
CERTIFICATE OF CORRECTION

PATENT NO. : 3,934,944          Page 2 of 2

DATED : January 27, 1976

INVENTOR(S) : LYLE M. FORSGREN

It is certified that error appears in the above—identified patent and that said Letters Patent are hereby corrected as shown below:

| | | | |
|---|---|---|---|
| Column 6, CLAIM 10 | Line 45, | after "exposed" insert --- heat transfer members within said belt sections, each of said ---; |
| Column 6, CLAIM 11 | Line 52, | after "section" cancel "including" and insert --- includes ---; |
| Column 6, CLAIM 12 | Line 55, | after "ribs" cancel "including" and insert --- includes ---; |
| Column 6, CLAIM 14 | Line 64, | after "bars" cancel "having" and insert --- have ---; |
| Column 7, CLAIM 15 | Line 10, | cancel "lines" and insert --- runs ---; |
| Column 7, CLAIM 15 | Line 11, | cancel "resiliently" and insert --- resilient ---; |
| Column 8, CLAIM 15 | Line 3, | after "slide" cancel "bars" and insert --- rails ---; |

Signed and Sealed this eleventh Day of May 1976

[SEAL]

Attest:

RUTH C. MASON
*Attesting Officer*

C. MARSHALL DANN
*Commissioner of Patents and Trademarks*